US010858502B2

(12) United States Patent
Chen et al.

(10) Patent No.: US 10,858,502 B2
(45) Date of Patent: *Dec. 8, 2020

(54) HALOGENATED WAX GRAFTED TO LOW MOLECULAR WEIGHT POLYMER

(71) Applicant: Bridgestone Corporation, Chuo-ku (JP)

(72) Inventors: Yaohong Chen, Akron, OH (US); Xiao-Dong Pan, Baytown, TX (US); Dennis R. Brumbaugh, North Canton, OH (US); Edward D. Kelley, Tallmadge, OH (US)

(73) Assignee: Bridgestone Corporation, Chuo-ku (JP)

( * ) Notice: Subject to any disclaimer, the term of this patent is extended or adjusted under 35 U.S.C. 154(b) by 70 days.

This patent is subject to a terminal disclaimer.

(21) Appl. No.: 16/207,305

(22) Filed: Dec. 3, 2018

(65) Prior Publication Data

US 2019/0119475 A1 Apr. 25, 2019

Related U.S. Application Data

(63) Continuation of application No. 15/540,882, filed as application No. PCT/IB2015/002538 on Dec. 22, 2015, now Pat. No. 10,144,794.

(60) Provisional application No. 62/098,690, filed on Dec. 31, 2014, provisional application No. 62/098,669, filed on Dec. 31, 2014.

(51) Int. Cl.
| | | |
|---|---|---|
| *C08L 9/06* | (2006.01) |
| *C01B 33/18* | (2006.01) |
| *C08F 289/00* | (2006.01) |
| *C08K 3/04* | (2006.01) |
| *C08K 3/36* | (2006.01) |
| *C08F 255/02* | (2006.01) |
| *B60C 1/00* | (2006.01) |
| *C08L 21/00* | (2006.01) |
| *C08L 51/04* | (2006.01) |
| *C08L 91/00* | (2006.01) |
| *C08L 91/06* | (2006.01) |
| *C08F 299/00* | (2006.01) |
| *C08G 81/02* | (2006.01) |
| *C08F 291/04* | (2006.01) |
| *C08C 19/30* | (2006.01) |
| *C08J 3/20* | (2006.01) |
| *C08L 51/06* | (2006.01) |

(52) U.S. Cl.
CPC .............. *C08L 9/06* (2013.01); *B60C 1/00* (2013.01); *B60C 1/0016* (2013.01); *C01B 33/18* (2013.01); *C08C 19/30* (2013.01); *C08F 255/023* (2013.01); *C08F 289/00* (2013.01); *C08F 291/04* (2013.01); *C08F 299/00* (2013.01); *C08G 81/02* (2013.01); *C08G 81/021* (2013.01); *C08J 3/203* (2013.01); *C08K 3/04* (2013.01); *C08K 3/36* (2013.01); *C08L 21/00* (2013.01); *C08L 51/04* (2013.01); *C08L 91/00* (2013.01); *C08L 91/06* (2013.01); *C08L 51/06* (2013.01); *C08L 2205/03* (2013.01); *C08L 2205/14* (2013.01)

(58) Field of Classification Search
CPC .. C08L 9/06; C08L 21/00; C08L 51/04; C08L 91/00; C08L 91/06; C08L 289/00; C08L 51/06; C08L 2205/03; C08L 2205/14; C08F 299/00; C08F 291/04; C08F 255/023; C08G 81/021; C08G 81/02; B60C 1/0016; B60C 1/00; C08J 3/203; C08C 19/30; C01B 33/18; C08K 3/04; C08K 3/36

See application file for complete search history.

(56) References Cited

U.S. PATENT DOCUMENTS

| | | | |
|---|---|---|---|
| 4,659,796 A | 4/1987 | Horie et al. |
| 5,780,537 A * | 7/1998 | Smith .................... C08K 5/548 |
| | | | 524/493 |
| 5,866,171 A | 2/1999 | Kata |
| 5,876,527 A | 3/1999 | Tsuruta et al. |
| 5,931,211 A | 8/1999 | Tamura |
| 5,971,046 A | 10/1999 | Koch et al. |

(Continued)

FOREIGN PATENT DOCUMENTS

| | | |
|---|---|---|
| CN | 101418116 A | 4/2009 |
| CN | 102585523 A | 7/2012 |

(Continued)

OTHER PUBLICATIONS

European Patent Office, "Extended European Search Report for European Patent Application No. 15875311.1", dated Jul. 2, 2018, 6 pages.

(Continued)

*Primary Examiner* — Alexander C Kollias

(74) *Attorney, Agent, or Firm* — Meredith E. Hooker; Nathan T. Lewis

(57) ABSTRACT

A wax-polymer compound includes (a) a polymer component that is a polymerized unsaturated monomer, optionally copolymerized with a vinyl-aromatic monomer, and (b) a halogenated hydrocarbon wax component. The polymer component is grafted to the halogenated hydrocarbon wax component, and the wax-polymer compound has a number average molecular weight of about 1,000 to about 100,000. A method of making the wax-polymer compound and a coated silica particle are also disclosed.

20 Claims, No Drawings

(56) References Cited

U.S. PATENT DOCUMENTS

| | | | |
|---|---|---|---|
| 6,193,791 B1* | 2/2001 | Vander Louw | C09G 1/10 106/10 |
| 7,029,818 B2* | 4/2006 | Rohr | C09D 5/035 430/137.15 |
| 10,144,794 B2* | 12/2018 | Chen | C08F 291/04 |
| 2004/0221503 A1* | 11/2004 | Murphy | C11C 5/008 44/275 |
| 2007/0108097 A1* | 5/2007 | Patel | C08L 23/04 208/20 |
| 2013/0231426 A1* | 9/2013 | Chen | C08L 21/00 524/269 |

FOREIGN PATENT DOCUMENTS

| | | |
|---|---|---|
| CN | 103154119 A | 6/2013 |
| EP | 1204005 A2 | 5/2002 |
| JP | S5825642 A | 2/1983 |
| JP | S58132014 A | 8/1983 |
| JP | S60203663 A | 10/1985 |
| JP | H0253814 A | 2/1990 |
| JP | H10101885 A | 4/1998 |
| JP | 2012027059 A | 2/2012 |
| WO | 2014020923 A1 | 2/2014 |

OTHER PUBLICATIONS

Novak, et al., "Modification of a Fischer-Tropsch Wax by Grafting with Maleic Anhydride", In Journal of Applied Polymer Science, vol. 93, 2004, pp. 662-668.

Dover Chemical Corporation, "Chlorez 700", 1 page.

World of Chemicals, "Chlorinated Paraffin Wax", Retrieved Date: Dec. 8, 2014, Retrieved At: <<http://www.worldofchemicals.com/chemicals/chemical-properties/chlorinated-paraftin-wax.html>>, 3 pages.

"Preliminary Amendment for U.S. Appl. No. 15/540,882", Filed Date: Jun. 29, 2017, 5 pages.

"Restriction Requirement for U.S. Appl. No. 15/540,882", dated Mar. 16, 2018, 8 pages.

"Response to the Restriction Requirement for U.S. Appl. No. 15/540,882", Filed Date: May 16, 2018, 6 pages.

"Notice of Allowance and Fees Due for U.S. Appl. No. 15/540,882", dated Sep. 25, 2018, 11 pages.

* cited by examiner

HALOGENATED WAX GRAFTED TO LOW MOLECULAR WEIGHT POLYMER

CROSS-REFERENCE TO RELATED APPLICATIONS

This application is a continuation of U.S. patent application Ser. No. 15/540,882, which on Jun. 29, 2017, entered the U.S. as a national stage application of PCT Application No. PCT/IB2015/002538 filed Dec. 22, 2015, which claims the benefit of priority to both U.S. Provisional Application No. 62/098,669 filed Dec. 31, 2014, and U.S. Provisional Application No. 62/098,690 filed Dec. 31, 2014. Each of these prior applications is incorporated herein by reference.

FIELD

This disclosure relates to a halogenated wax-grafted to a low molecular weight polymer.

BACKGROUND

Hydrocarbon waxes have been used in rubber compositions to improve certain properties of the composition. In applications such as tires, wax has been used as an antiozonant. Chemical attack by ozone is thought to be one of the main causes of aging and deterioration of tires Effective waxes protect the rubber from ozone attack by migrating to the surface and forming a protective film on the tire. Waxes are also not typically thought of as improving the performance characteristics of the tire, such as traction or wear resistance.

Rubber compositions traditionally are made with aromatic processing oil, which enables the rubber compositions to be softened and more easily processed. Aromatic oil used in tire tread compositions can provide the tread rubber with improved traction over a composition with no oil. However, some European countries have passed regulations to limit the amount of aromatic oil or polycyclic-aromatic containing oil used in the rubber compositions. Many cost-effective substitutes for aromatic oil, such as synthetic ester oils and hydrogenated aromatic oils, do not provide the same beneficial properties imparted by traditional aromatic oils.

SUMMARY

The present application describes a grafted wax and low molecular weight polymer that, in embodiments, provides synergistic benefits in rubber compositions.

In an embodiment, a wax-polymer compound includes (a) a polymer component that is a polymerized unsaturated monomer, optionally copolymerized with a vinyl-aromatic monomer, and (b) a halogenated hydrocarbon wax component. The polymer component is grafted to the halogenated hydrocarbon wax component, and the wax-polymer compound has a number average molecular weight of about 1,000 to about 100,000.

In an embodiment, a method for making a wax-polymer compound includes mixing (a) a polymer component that is living or functionalized, and that is a polymerized unsaturated monomer, optionally copolymerized with a vinyl-aromatic monomer, and (b) a halogenated hydrocarbon wax component. The polymer component is grafted to the halogenated hydrocarbon wax component, and the wax-polymer compound has a number average molecular weight of about 1,000 to about 100,000.

In an embodiment, a coated silica composition includes silica coated with a wax-polymer compound. The wax-polymer compound includes (a) a polymer component that is a polymerized unsaturated monomer, optionally copolymerized with a vinyl-aromatic monomer, and (b) a halogenated hydrocarbon wax component. The polymer component is grafted to the halogenated hydrocarbon wax component, and the wax-polymer compound has a number average molecular weight of about 1,000 to about 100,000.

DETAILED DESCRIPTION

In an embodiment, a low molecular weight polymer is grafted with a halogenated hydrocarbon wax. The wax-polymer compound was surprisingly found to exhibit unique properties in a rubber composition that includes carbon black or silica filler and optionally other additives. In particular, properties useful in tire components were found to be improved, including wet traction, wear resistance upon aging, increase in bound rubber and Mooney viscosity comparable or lower than that provided by oil. Different beneficial effects were found in carbon and silica compounds, indicating that the wax-polymer additive was producing a synergistic interaction with the filler, instead of simply providing effects of a typical wax and low molecular weight polymer/oil.

Without being bound to theory, it is believed that the wax-polymer additive has one or more of the following types of interaction in a filled rubber composition. (1) The wax-polymer additive is dispersed in and interacts with other components of the polymer matrix, including filler and high molecular weight elastomer. (2) The wax-polymer additive blooms to the surface of the composition providing surface modification. (3) The wax-polymer additive interacts with and coats the filler, acting as a shielding agent. In this case, some of coated filler may also migrate to the surface of the composition.

In an embodiment, the wax-polymer additive includes: (a) a polymer component that is a polymerized unsaturated monomer, optionally copolymerized with a vinyl-aromatic monomer, and (b) a halogenated hydrocarbon wax component. The terms "polymer component" and "halogenated hydrocarbon wax component" are meant to indicate that the polymer and wax are components of a grafted compound; however, in determining molecular weight or other properties of each component, determinations of these properties may be made based on the polymer or wax prior to the grafting reaction.

In an embodiment, the wax is halogenated in multiple locations along the hydrocarbon backbone of the wax, and the wax-polymer additive derived from the halogenated wax has a structure with the wax component forming a backbone of the additive and the polymer component forming one or more grafted branches or "brushes" extending from the backbone. In an embodiment, the wax component may include halogen groups that were not substituted.

In an embodiment of the grafting reaction, an unsaturated unit of the polymer component displaces a halogen on the wax component. The location of the displaced halogen on the wax may thus be referred to as a graft location. In an embodiment, several units of unsaturation on a single polymer chain react with and create a bond to multiple graft locations of the halogenated wax component resulting in multiple halogen leaving groups. In an embodiment, two or more polymer chains of the polymer component bond to two or more graft locations on the halogenated wax component. In an embodiment, the wax-polymer additive has a ratio of the halogenated hydrocarbon wax to the polymer of about 1:1 to about 1:20, such as, for example, about 1:2 to about 1:15, or about 1:4 to about 1:10.

In an embodiment, the wax-polymer additive may be included in the rubber composition in an amount of about 0.1 phr to about 60 phr, such as, for example, about 1 phr to about 10 phr, or 5 phr to about 30 phr.

The wax may be grafted to the low-molecular weight polymer by dissolving the polymer or polymerizing the polymer in a hydrocarbon solvent, such as a non-polar solvent, for example, hexane, in a container. In an embodiment, the polymerized low-molecular weight polymer is not terminated and has a living end when mixed with the halogenated wax. The halogenated wax, which may be pre-dissolved in hydrocarbon solvent, such as a polar solvent, for example, tetrahydrofuran, is also added to the container. In an embodiment, the live end of the polymer reacts with the halogenated wax by substituting for halogen leaving groups. In another embodiment, the polymer is functionalized with a group that will react with the chlorinated wax, For example, the functional group may be a halogen, oxygen, nitrogen, or silicon containing group. The contents of the container are then mixed and/or heated. The reaction may then be terminated with a terminating agent, such as butylated hydroxytoluene (BHT) in isopropanol. BHT may stabilize the polymer and reduce gel contents. However, other functional and/or non-functional terminating agents may be used. The contents of the container may then be coagulated, such as with an alcohol, and dried by conventional methods.

In an embodiment, and without being bound by theory, a chlorinated wax is modified with a low-molecular weight polymer by the reaction formula I:

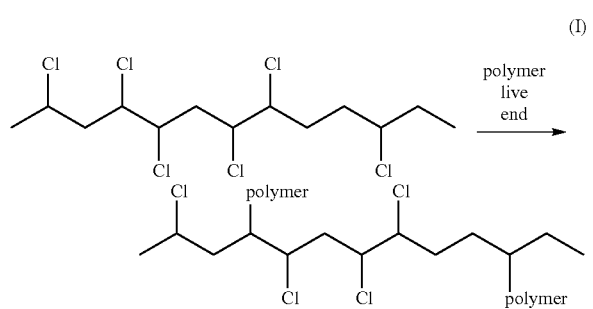

Reaction formula I is an example only. Other embodiments may differ in halogen, carbon chain, and grafting and functional group locations.

In an embodiment, the low molecular weight polymer may be synthesized and grafted in the same container without an intermediate isolation or separation step. The synthesis in this case, may be solution polymerization, such as living solution polymerization, for example, anionic or cationic living polymerization. Optionally a randomizer is added to randomize the monomer addition of the polymer to make random copolymers instead of block copolymers.

The wax and the polymer from which the grafted-wax additive are derived are discussed in more detail below.

In an embodiment, the low molecular weight polymer is derived from at least one unsaturated monomer, such as a diene monomer. In an embodiment, the polymer is derived, for example, from the polymerization of one or more of the following conjugated diene monomer units 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

In certain embodiments, suitable diene polymers and diene copolymers used in the tire rubber compositions disclosed herein can be derived from the polymerization of one or more of the conjugated diene monomers disclosed above and one or more vinyl aromatic hydrocarbon monomers. Examples of suitable vinyl aromatic hydrocarbon monomers include, but are not limited to styrene, α-methylstyrene, p-methylstyrene, o-methylstyrene, p-butylstyrene, vinylnaphthalene, and combinations thereof.

Examples of suitable conjugated diene polymers and conjugated diene copolymers for use as the polymeric component of the wax-polymer additive include, but are not limited to, polyisoprene, polybutadiene, butadiene-isoprene copolymer, butadiene-isoprene-styrene copolymer, isoprene-styrene copolymer, styrene-butadiene copolymer, natural rubber, butyl rubber, halogenated butyl rubber, and combinations thereof. In an embodiment, the rubber compositions comprise a combined amount of 100 phr of the at least one conjugated diene polymer or copolymer.

In certain embodiments, the diene polymer or copolymer (as described above) within the rubber composition is functionalized with a functional chemical group at one end, both ends, or along the backbone of the polymer or copolymer. In certain embodiments, the conjugated diene polymer or copolymer is functionalized or coupled with a tin or silica-containing compound such as with tin tetrachloride, dibutyl tin chloride, or with another suitable compound, non-limiting examples of which include cyclic amines, polyisocyanates, cyclic ureas, a silyl chloride, polyisocyanates, carbodiimides, polyepoxides, and alkoxysilanes.

In an embodiment, the polymer component has a low molecular weight, and is a liquid at 25° C. A number average molecular weight of the polymer may, for example, range from about 500 to about 20,000, such as about 1,000 to about 15,000, or about 2,500 to about 8,000. In an embodiment, the polymer may have a vinyl content of about 10% to about 90%, such as about 15% to about 50%, or about 20% to about 40%. In an embodiment, the polymer may have a vinyl aromatic hydrocarbon content of about 5% to about 45%, such as about 10% to about 40%, or about 15% to about 35%. In an embodiment, the polymer may have a glass transition temperature of about −10° C. to about −115° C., such as about −20° C. to about −55° C., or about −95° C. to about −108° C. If the polymer is a copolymer, it may be random, tapered, or block.

In an embodiment, the halogenated wax is halogenated version of a microcrystalline wax or paraffin wax. Paraffin waxes are generally unbranched $C_{20}$ to $C_{40}$ alkane waxes. Microcrystalline waxes are hydrocarbon waxes that generally have a higher percentage of isoparaffinic and naphthenic groups than paraffin waxes and also have a smaller crystalline structure as compared to the paraffin waxes. The weight percent of halogenation of the wax may vary from about 0.1 to about 75%, such as, for example, about 25% to about 75%, or about 50% to about 71%. The hydrocarbon chain may be branched or unbranched. A ratio of carbon atoms to halogen atoms may range from about 1:1 to about 1:50, such as about 1:2 to about 1:25, or about 1:5. The carbon chain length of the wax, may, for example, range from 8 to 50 carbon atoms; it may, for example, be a short chain ($C_{10-13}$), medium chain ($C_{14-17}$), or long chain, ($C_{>17}$). The halogen group may be selected from one or more of the group consisting of chlorine, fluorine, iodine, or bromine.

In an embodiment, the halogenated wax is a solid, for example, at 0° C. or 25° C., and has a softening point of about 30° C. to about 150° C., such as about 75° C. to about 125° C., or about 90° C. to about 110° C. (ASTM D-36). The halogenated wax may have a particle size corresponding to passage of about 80 to about 99% through 297 Micron mesh, such as about 90 to about 97.5%, or about 92.5 to about 96%. The halogenated wax may have a number average molecular weight of about 200 to about 5,000, such as, for example, about 500 to about 4,000, or about 1,000 to about 3,500.

Suitable types of chlorinated hydrocarbon waxes for use in the rubber compositions disclosed herein include hydrocarbon waxes having a chlorocarbon segment, e.g., hydrocarbon segments in which some or all hydrogens have been replaced with chlorine atoms along the carbon chain. In certain embodiments, the chlorinated hydrocarbon wax is a chlorinated paraffin wax. Suitable, but non-limiting, examples of chlorinated hydrocarbon waxes suitable for use in the rubber compositions disclosed herein include. Notably, as used herein, the term chlorinated hydrocarbon wax should be considered to include compounds that are solids at room temperature and compounds that are oils at room temperature, unless it is clear from the context that only compounds that are solid at room temperature are intended.

Accordingly, because suitable chlorinated hydrocarbon waxes that are utilized may contain varying amounts of chlorine, it should be understood that the total amount of chlorination added to the rubber composition can be varied by adjusting the amount (phr) of chlorinated hydrocarbon wax added to the rubber composition and/or the chlorine content of the chlorinated hydrocarbon wax added to the rubber composition. Therefore, the total amount of chlorination added to the rubber composition may vary from about 0.005 to about 7.5 phr (parts chlorine per hundred parts rubber in the rubber composition). In certain embodiments utilizing chlorinated hydrocarbon wax, the amount of chlorination added to the rubber composition is from about 1 to about 4 phr, or about 1.5 to about 3 phr.

Suitable types of fluorinated hydrocarbon waxes for use in the rubber compositions disclosed herein include hydrocarbon waxes having a perfluorocarbon segment, e.g., a hydrocarbyl segment in which all hydrogens have been replaced with fluorine atoms along the carbon chain. An example of this type of wax is a block copolymer having a perfluorocarbon block segment and a hydrocarbon block segment. In certain embodiments of this type of fluorinated wax, the block copolymer is represented by the general formula $F_3C-(CF_2)_m-(CH_2)_n-CH_3$, where m is an integer ranging from 1 to about 40, n is an integer ranging from about 3 to about 40, and n+m must be greater than about 18. Thus, in one embodiment, the fluorinated hydrocarbon wax used in the rubber compositions disclosed herein is a block copolymer having a perfluorocarbon block segment and a hydrocarbon block segment.

In certain embodiments of rubber compositions disclosed herein, the hydrocarbon segment of the fluorinated wax is a paraffin segment, i.e., an unbranched alkane chain having from about 20 to about 40 carbon atoms. Thus, in one embodiment, n, in the general formula described above, ranges from about 20 to about 40. In accordance with certain embodiments of the rubber compositions disclosed herein, the fluorinated hydrocarbon wax is a fluorinated paraffin wax.

Suitable fluorinated hydrocarbon waxes used in the rubber compositions disclosed herein include from about 0.2 to about 70% by weight fluorine based on the total weight of the wax. In certain embodiments, the fluorinated hydrocarbon wax used includes from about 0.2 to about 12% by weight fluorine or from about 1% to about 8% by weight fluorine. Accordingly, because suitable fluorinated hydrocarbon waxes that are utilized may contain varying amounts of fluorine, it should be understood that the total amount of fluorination added to the rubber composition can be varied by adjusting the amount (phr) of fluorinated wax added to the rubber composition and/or the fluorine content of the fluorinated wax added to the rubber composition. Therefore, the total amount of fluorination added to the rubber composition may vary from about 0.0004 phr to about 5 phr (parts fluorine per hundred parts rubber). In certain embodiments, the amount of fluorination added to the rubber composition is from about 0.004 to about 1.2 phr, from about 0.04 to about 0.6 phr, from about 0.1 to about 0.2.

In other embodiments, the halogenated hydrocarbon wax is a brominated hydrocarbon wax. Various types of brominated hydrocarbon waxes may be suitable for use in the embodiments disclosed herein, including those containing various weight percentages of bromine such as about 20 to about 75% by weight based upon the weight of the wax, alternatively about 35 about 75% by weight based upon the weight of the wax. In an embodiment, the wax may include both chlorine and bromine and, accordingly, as noted in other portions of this disclosure, it should be considered to be within the scope of the disclosure to include a combination of chlorinated hydrocarbon wax and brominated hydrocarbon wax (either as separate waxes or via introduction of one wax containing both chlorine and bromine).

In certain embodiments, the halogenated hydrocarbon wax is an iodated wax. Various types of iodated hydrocarbon waxes may be suitable for use in the embodiments disclosed herein, including those containing various weight percentages of iodine such as about 20 about 75% by weight based upon the weight of the wax, alternatively about 35 about 75% by weight based upon the weight of the wax.

In accordance with one embodiment, it is contemplated that the wax-polymer additive may include a combination of at least one fluorinated hydrocarbon wax as disclosed herein and at least one chlorinated hydrocarbon wax.

It was discovered that the wax-polymer additive displays synergistic properties in rubber compositions filled with silica and carbon black. Different and unexpected properties were seen in a carbon black filled composition and a silica filled composition. The examples presented below show these effects.

For example, when the filler comprises carbon black, and the wax-polymer additive is substituted for at least a portion of processing oil, such as about 5 phr of oil or less, about 10 to about 15 phr of oil, or about 2.5 phr to about 20 phr of oil, the composition may have a Mooney viscosity (ML1+4, 103° C., RPA) of about 20 to about 60, such as about 22 to about 35, or about 25 to about 30. Alternatively, the wax-polymer additive is substituted for at least a portion of processing oil, leaving only 5 phr or less of oil, or about 2.5 phr to about 10 phr of oil, or about 12 phr to about 20 phr of oil. The data in the examples demonstrates that the wax-polymer additive acts efficiently as an oil replacement in carbon black filled compositions. In an embodiment, the filler comprises carbon black and the composition is vulcanized and has a bound rubber content of about 31% to about 50%, such as about 32% to about 45% or about 35% to about 40%. This shows that the wax-polymer composition also increases bound rubber material properties in the vulcanized state while providing oil-like properties in the unvulcanized state.

For example, wherein the filler comprises silica and the composition is vulcanized, in an embodiment, the composition has at least about 3% higher (such as about 5% or higher, or about 3% to about 40%) indexed value in aged wear resistance over a control composition that is the same as the composition except it contains the halogenated wax, instead of the wax-polymer additive derived from the halogenated wax. The aged wear resistance may be determined by Lambourn (25% slip) aged 4 days at 50° C. and 95% humidity.

In an embodiment, the wax-polymer compound coats the silica, thereby forming the wax-polymer compound, the wax-polymer compound having a number average molecular weight of about 1,000 to about 100,000. The coating may occur in situ upon mixing the wax-polymer compound with a rubber elastomer and silica. Alternatively, the silica may be pre-coated with the wax-polymer compound, such as by mixing the dissolved wax-polymer with silica or a dry mixing process.

Generally, any filler(s) conventionally used to prepare rubber compositions can be used in the rubber compositions described herein. Examples of suitable fillers used in the rubber compositions disclosed herein include, but are not limited to, reinforcing fillers such as carbon black; silica; mineral fillers such as clay (e.g., hydrous aluminum silicate), exfoliated clay, talc (hydrous magnesium silicate), aluminum hydrate ($Al(OH)_3$), and mica; as well as metal oxides such as aluminum oxide; and titanium dioxide. Additional useful fillers suitable for use in the rubber compositions disclosed herein are known to those skilled in the art.

The amount of the at least one filler that is contained within the rubber composition is about 5 to about 200 phr, such as, for example, about 20 phr to about 99 phr, or about 45 phr to about 80 phr, wherein a majority of the filler is carbon black, silica or a combination thereof. The amount of carbon black may range, for example, from about 2.5 phr to about 100 phr, such as about 10 to about 65 phr, or about 20 phr to about 50 phr. The amount of silica may range, for example, from about 2.5 phr to about 120 phr, such as about 20 phr to about 99 phr, or about 40 phr to about 70 phr. Additional fillers such as clay, metal oxides, and combinations thereof, may also be included in minority amounts. In an embodiment, the composition may be exclusive of one of carbon black or silica, and/or other fillers.

Examples of suitable types of carbon blacks used as the filler in certain embodiments of the tire rubber composition disclosed herein include furnace blacks, channel blacks, and lamp blacks. More specifically, examples of suitable carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks, and conducting channel blacks. Other examples of suitable carbon blacks include, but are not limited to, acetylene blacks. Furthermore, a mixture of two or more of the aforementioned carbon blacks can be used as the filler in certain embodiments of the tire rubber composition disclosed herein. The grades of the carbon blacks suitable for use in certain embodiments of the rubber compositions disclosed herein are those characterized by ASTM D-1765, such as N-110, N-134, N-220, N-339, N-330, N-351, N-550, N-660, and N990 grades. Other grades of carbon black may also be suitable for use in certain embodiments of the rubber compositions disclosed herein, either alone, in combination or in combination with the previously listed grades of carbon black.

The carbon blacks used in accordance with embodiments of the tire rubber composition disclosed herein can be in a pelletized form or an unpelletized flocculent mass.

Examples of silica used as the filler in certain embodiments of the tire rubber composition disclosed herein include, but are not limited to, precipitated amorphous silicas, dry silicas such as fumed silica, and calcium silicate. Other suitable fillers include aluminum silicate and magnesium silicate. In an embodiment, the silica may be treated with additional agents, such as silane.

The abbreviation "phr," as used herein, means per hundred rubber, and is based on the main high molecular weight rubber component of the composition.

The rubber compositions disclosed herein include at least one rubber elastomer that is a polymer or copolymer of relatively high molecular weight. The elastomer may, for example, have a number average molecular weight of about 100,000 to about 1,000,000, such as, for example, about 150,000 to about 500,000, or about 200,000 to about 350,000. The elastomer may, for example, may have a polydispersity (Mw/Mn) of about 1.1 to about 7, such as about 1.5 to about 5, or about 2 to about 3. The elastomer may have a glass transition temperature of about −10° C. to about −115° C., such as about −20° C. to about −55° C., or about −95° C. to about −108° C. If the polymer is a copolymer, it may be random, tapered, or block. If the elastomer is synthetic, it may be made by solution or emulsion polymerization.

In an embodiment, the elastomer comprises an unsaturated polymer, such as a conjugated diene polymer or copolymer comprising at least one polymerized conjugated diene monomer and optionally at least one polymerized vinyl-containing monomer. Such conjugated diene polymers and conjugated diene copolymers can be derived, for example, from the polymerization of one or more of the following conjugated diene monomer units 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof.

In certain embodiments, suitable unsaturated polymers and copolymers used in the tire rubber compositions disclosed herein can be derived from the polymerization of one or more of the conjugated diene monomers disclosed above and one or more vinyl aromatic hydrocarbon monomers. Examples of suitable vinyl aromatic hydrocarbon monomers include, but are not limited to, styrene, α-methylstyrene, p-methylstyrene, o-methylstyrene, p-butylstyrene, vinyl-naphthalene, and combinations thereof.

Examples of suitable unsaturated polymers and copolymers for use as the elastomer in the rubber compositions disclosed herein include, but are not limited to, polyisoprene, polybutadiene, butadiene-isoprene copolymer, butadiene-isoprene-styrene copolymer, isoprene-styrene copolymer, styrene-butadiene copolymer, natural rubber, butyl rubber, halogenated butyl rubber, and combinations thereof. In accordance with the rubber compositions disclosed herein, the rubber compositions comprise a combined amount of 100 phr of the at least one elastomeric polymer.

In certain embodiments, the conjugated diene polymer or copolymer (as described above) within the rubber composition is functionalized with a functional chemical group at one end, both ends, or along the backbone of the polymer or copolymer. In certain embodiments, the conjugated diene polymer or copolymer is functionalized or coupled with a tin or silica-containing compound such as with tin tetrachloride, dibutyl tin chloride, or with another suitable compound, non-limiting examples of which include cyclic amines, polyisocyanates, cyclic ureas, a silyl chloride, polyisocyanates, carbodiimides, polyepoxides, and alkoxysilanes.

In certain embodiments of the tire rubber composition disclosed herein, a silane coupling agent is used when silica or some other type of inorganic particles are used as the filler. In such embodiments, the silane coupling agent helps bond the filler to the conjugated diene polymer or copolymer (i.e., the elastomer), thereby improving the wear resistance of the vulcanized rubber composition. Examples of suitable silane coupling agents include, but are not limited to, functionalized polysulfide silanes such as bis(trialkoxysilylorgano) polysulfide silanes and thiocarboxylate functional silanes such as a 3-octanoylthio-1-propyltriethoxysilane.

In accordance with certain embodiments, the rubber compositions disclosed herein further include a conventional wax and/or processing oil in addition to the wax-polymer additive. However, in other embodiments, the composition may also be exclusive of an effective amount or all of a wax and/or processing oil. An effective amount of wax or oil would be an amount required to produce an antioxidant effect for wax (such as, for example about 0.1 phr or greater, and a viscosity reduction for oil, such as about 3 phr or greater. Examples of suitable conventional waxes for use in the rubber compositions disclosed herein include hydrocarbon waxes, such as, for example, microcrystalline waxes and paraffin waxes. In certain embodiments, the conventional wax includes a microcrystalline wax, a paraffin wax, and combinations thereof. In accordance with one or more embodiments, the conventional wax can be added to the rubber composition in an amount of about 0.1 phr to about 10 phr, such as about 1 phr to about 3 phr, or about 0.5 phr to about 2.5 phr. In accordance with one or more embodiments, the processing oil can be added to the rubber composition in an amount of about 3 phr to about 50 phr, such as about 5 phr to about 35 phr, or about 10 phr to about 20 phr.

The rubber compositions disclosed herein include a curative package. In accordance one or more embodiments, a curative package includes at least one vulcanizing agent and optionally any of: vulcanizing accelerators; vulcanizing activators, such as zinc oxide and stearic acid; vulcanizing inhibitor; and anti-scorch agents. A "vulcanizing agent" refers to the compounds used alone, or as part of a system, to cure, i.e., crosslink, the rubber composition during vulcanization. In certain embodiments, the curative package includes at least one vulcanizing agent and at least one vulcanizing accelerator. In other embodiments, the curative package includes at least one vulcanizing agent, at least one vulcanizing accelerator, and at least one vulcanizing activator. In yet other embodiments, the curative package includes at least one vulcanizing agent, at least one vulcanizing accelerator, at least one vulcanizing activator, and at least one vulcanizing inhibitor. In still other embodiments, the curative package includes at least one vulcanizing agent, at least one vulcanizing accelerator, at least one vulcanizing activator, at least one vulcanizing inhibitor, and at least one anti-scorching agent.

Examples of suitable types of vulcanizing agents used in the rubber compositions disclosed herein, include but are not limited to, sulfur or peroxide-based curing systems. Examples of specific suitable sulfur vulcanizing agents used in the rubber compositions disclosed herein include "rubbermaker's" soluble sulfur; sulfur donating curing agents, such as an amine disulfide, polymeric polysulfide or sulfur olefin adducts; and insoluble polymeric sulfur. In an embodiment, the sulfur vulcanizing agent is soluble sulfur or a mixture of soluble and insoluble polymeric sulfur. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. In an embodiment, a vulcanizing agent that produces a sulfidic bridge crosslink is utilized. The sulfur vulcanizing agents are used in an amount ranging from about 0.1 to about 10 phr, about 0.2 to about 7.5 phr, or about 0.2 to about 5 phr.

Vulcanizing accelerators are used to control the time and/or temperature required for vulcanization and to improve properties of the vulcanizate. Examples of suitable vulcanizing accelerators used in the rubber compositions disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS); guanidine vulcanization accelerators, such as diphenyl guanidine (DPG); thiuram vulcanizing accelerators; carbamate vulcanizing accelerators. The amount of the vulcanization accelerator used ranges from about 0.1 to about 7 phr, about 0.2 to about 5 phr, or about 0.5 phr to about 3 phr.

As mentioned above, process oils can be used to extend and soften the rubber compositions disclosed herein. The wax-polymer additive, in some embodiments, allows for replacement of a part or all of the oil of a typical composition. In embodiments that contain processing oil in addition to the polymer—wax additive, the processing oil includes but is not limited to, paraffinic oils, aromatic oils, naphthenic oils, vegetable oils other than castor oils, and low polycyclic aromatic content ("low PCA") oils. Low PCA oils are oils that contain less than 3 weight percent polycyclic aromatic content (as measured by IP346). Examples of such low PCA oils useful for the rubber compositions disclosed herein include various naphthenic oils, mild extraction solvates (MES) and treated distillate aromatic extracts (TDAE).

Other additives that can be used in the rubber compositions disclosed herein are also well known to those of skill in the art and include resins, such as tackifying resins; reinforcing resins; plasticizers; pigments; zinc oxide; antioxidants such as diphenyl-p-phenylenediamine (DPPD), N-(1,3-dimethylbutyl)-N"-phenyl-1,4-benzenediamine (6PPD); anti-ozonants; peptizing agents; recycled crumb rubber; and asphalt. In a particular embodiment, the composition is free of asphalt.

The rubber compositions disclosed herein are useful for different components of a pneumatic tire, including, but not limited to, treads, subtreads, sidewalls, bead fillers, carcass layers, sidewall reinforcements, and run-flat reinforcements.

The rubber compositions disclosed herein can be prepared using standard equipment such as, e.g., Banbury or Brabender mixers. For further explanation of rubber compounding and the additives conventionally employed, one can refer to The Compounding and Vulcanization of Rubber, by Stevens in Rubber Technology, Second Edition (1973 Van Nostrand Reibold Company), which is incorporated herein by reference. Typically, the rubber compositions disclosed herein are prepared using two or more mixing stages. During the first stage (also known as the "master batch" stage), ingredients including the rubber components and fillers are mixed. The mixing during this stage typically occurs at temperatures of about 100° C. to about 200° C. for a period of time or until a discharge or drop temperature, typically about 165° C., is reached. To prevent premature vulcanization (also known as scorch), this initial masterbatch may exclude any vulcanizing agents or other components of the curative package.

For certain rubber compositions such as where a formulation includes higher amounts of filler or fillers other than (or in addition to) carbon black, a separate re-mill stage may be employed for separate addition of the other fillers in order to reduce the compound viscosity and improve the dispersion of the fillers. This stage often is performed at temperatures similar to, although often slightly lower than, those employed in the master batch stage.

Most or all of the components of the curative package, e.g., vulcanizing agents, vulcanizing accelerators, vulcanizing activators, etc., are generally added at a final mixing stage. To avoid undesirable scorching and/or premature onset of vulcanization, this mixing step often is done at lower temperatures, e.g., starting at about 60° C. to about 75° C. and not going higher than about 105° C. to about 110° C. As referred to herein, the term "final batch" means the composition that is present during the final mixing stage. Typically, when the rubber compositions are to be used in tires, vulcanization is effected by heating the vulcanizable composition in a mold under pressure. Pneumatic tires can be made as disclosed in U.S. Pat. Nos. 5,866,171, 5,876,527, 5,931,211, and 5,971,046, which are incorporated herein by reference.

Depending upon the ultimate use for the rubber composition, it may be processed (e.g., milled) into sheets prior to being formed into any of a variety of components and then vulcanized, which typically occurs at about 5° C. to about 15° C. higher than the highest temperatures employed during the mixing stages, most commonly about 170° C.

EXAMPLES

The halogenated wax used in the examples below was a chlorinated paraffin wax that was solid at 25° C. It had a chlorine wt. percent of 71% based on the total weight of the wax and a softening point of 103° C. (ASTM D-36) and a melting point of 70.2° C. The halogenated wax had a particle size corresponding to a 95% pass through a 297 Micron mesh and a molecular weight 1160 g/mol.

The rubber compounding examples below were performed with the following procedures. Polymer, filler, coupling agent (when present), oil, antioxidant, stearic acid, and a wax or grafted wax ingredient were added in a masterbatch stage in a Brabender mixer. The mixing speed increased to 90 RPM during the time period of 30 sec to 4.5 min. The master-batched polymers were dropped around 165° C. at 5.5 min of mixing time. The final batch was completed by adding sulfur, zinc oxide, and accelerators and dropping around 105° C. at 2.5 min of mixing time.

Lambourn abrasion testing is performed as follows. Test specimens are placed on an axle and run at various slip angles and speeds, against a driven abrasive surface. Dry talc powder (100 series) is used as a lubricant and is supplied by a metering system. The test specimen is weighed before testing and after testing to determine the amount of material loss. Test specimen geometry is circular with the following approximate dimensions: inside diameter=0.900 inch (22.86 mm), outside diameter=1.900 inch (48.26 mm), thickness=0.195 inch (4.95 mm). The test surface is 3M 120-grit psa paper on an aluminum wheel. The machine was warmed up at least 30 minutes prior to testing. An air supply at 0.5-psi is used to disperse talc to a fine dust form. Additional machine settings are: thumbwheel type, sample speed set 34 (all slips), 200 rpm. Drum speed set: 24 (25% slip) and 12 (65% slip). Test settings are 25% slip—test time of 90 to 180 seconds, and talc setting of 0.6; 65% slip—test time of 25 to 60 seconds, talc setting of 1.

Bound rubber testing is measured by immersing small pieces (about ⅛ inch diameter) of uncured compounded rubber stocks (approximately 0.2 grams of the compounded stock)) in an aluminum sample cylinder with 40 mesh stainless steel screen. The sample cylinder is placed in a sealed container with 100 mL of toluene solvent. After three days the remaining sample is removed from the solvent and thoroughly dried. The remaining pieces form a weak coherent gel containing the filler and some of the original rubber. The amount of rubber remaining with the filler is weighed and is the bound rubber. % Bound rubber is calculated as follows:

% Bound rubber=$(100(Wd-F))/R$

Wd=weight of dried gel
F=weight of filler in gel or solvent insoluble matter (same as weight of filler in original sample)
R=weight of polymer in original sample Example 1: Synthesis of Chlorinated Wax Grafted with SBR In Example 1, 13.3 g of styrene (34 wt % in hexane), 85.6 g of butadiene (22.6 wt % in hexane), and 300 g hexane were charged to a 0.8 Liter bottle sealed and purged with nitrogen. To the bottle was charged 7 ml of butyl lithium (1.60 M in hexane) and 3 ml of 2,2'-di(tetrahydrofuryl)propane (1.6 M in hexane). After stirring approximately 100 minutes at room temperature, 1 ml of 2,2'-di(tetrahydrofuryl)propane and 30 ml of the halogenated wax (8.3% in tetrahydrofuran (THF)) were added to the bottle. The bottle contents were then terminated with 9 ml of butylated hydroxytoluene (BHT) in isopropanol, coagulated with ethanol and dried under vacuum. The isolated wax grafted with SBR polymer had the following properties: Mn=3.8 kg/mol, Mw=5.1 kg/mol, MWD=1.35, Tg=−24.67° C., styrene 20.4%, vinyl=58.6%, Cl=0.4%.

Example 2: Synthesis of Chlorinated Wax Grafted with SBR

In Example 2, 17.08 g of styrene (34 wt % in hexane), 109.6 g of butadiene (22.6 wt % in hexane), and 186 g hexane were charged to a 0.8 Liter bottle sealed and purged with nitrogen. To the bottle was charged 9.07 ml of butyl lithium (1.60 M in hexane) and 4.46 ml of 2,2'-di(tetrahydrofuryl)propane (1.6 M in hexane). After stirring approximately 80 minutes at room temperature, 1 ml of 2,2'-di (tetrahydrofuryl)propane and 30 ml of halogenated wax (8.3% in THF) were added to the bottle. The bottle contents were then terminated with 9 ml of BHT in isopropanol, coagulated with ethanol and dried under vacuum. The isolated polymer had the following properties: Mn=3.9 kg/mol, Mw=5.4 kg/mol, MWD=1.38, Tg=−24.67° C., styrene 22.4%, vinyl=56%, and Cl=0.28%.

Example 3: Synthesis of Chlorinated Wax Grafted with SBR

In Example 3, 26.7 g of styrene (34 wt % in hexane), 171.7 g of butadiene (22.6 wt % in hexane) and 206 g hexane were charged to a 0.8 Liter bottle sealed and purged with nitrogen. To the bottle was charged 14.2 ml of butyl lithium (1.60 M in hexane) and 7 ml of 2,2'-di(tetrahydrofuryl)propane (1.6 M in hexane). After stirring approximately 60 minutes at room temperature, 1 ml of 2,2'-di(tetrahydrofuryl)propane and 30 ml of the halogenated wax (8.3% in THF) were added to the bottle. The bottle contents were then terminated with 9 ml of BHT in isopropanol, coagulated with ethanol and dried under vacuum. The isolated polymer had the following properties: $M_n$=4.1 kg/mol, $M_w$=5.9 kg/mol, MWD=1.43, $T_g$=−26.45° C., styrene 22.2%, vinyl=55%, and Cl=0.2%.

Example 4: Synthesis of Chlorinated Wax Grafted with SBR

In Example 4, 13.3 g of styrene (34 wt % in hexane) and 85.6 g of butadiene (22.6 wt % in hexane) and 210 g hexane were charged to a 0.8 Liter bottle sealed and purged with nitrogen. To the bottle was charged 7 ml of butyl lithium (1.60 M in hexane) and 3 ml of 2,2'-di(tetrahydrofuryl)propane (1.6 M in hexane). After stirring approximately 90 minutes at room temperature, 1 ml of 2,2'-di(tetrahydrofuryl)propane and 30 ml of the halogenated wax (8.3% in THF) were added to the bottle. The bottle contents were then terminated with 9 ml of BHT in isopropanol, coagulated with ethanol and dried under vacuum. The isolated polymer had the following properties: $M_n$=4.0 kg/mol, $M_w$=5.2 kg/mol, MWD=1.35, $T_g$=−30.71° C., styrene 20.1%, vinyl=57.8%, and Cl=0.1%.

Three SBR-grafted Cl-waxes, from Examples 1-3 above, were characterized as shown in Table 1.

TABLE 1

| Wax-SBR | GPC | | | | $^1$H-NMR (mol %) | | | | $T_g$ (° C.) |
|---|---|---|---|---|---|---|---|---|---|
| | $M_z$ (kg/mol) | $M_n$ (kg/mol) | $M_w$ (kg/mol) | $M_w/M_n$ | Styrene | Vinyl | 1,4% | Cl % | |
| SBR-polymer brush, prior to wax grafting | 2.6 | 2.0 | 2.3 | 1.16 | n/a | n/a | n/a | n/a | n/a |
| Example 1 | 7.0 | 3.8 | 5.1 | 1.35 | 11.6 | 64.3 | 23.3 | 0.4 | −24.67 |
| Example 2 | 7.4 | 3.9 | 5.4 | 1.38 | 13.0 | 62.6 | 24.1 | 0.3 | −25.38 |
| Example 3 | 8.4 | 4.1 | 5.9 | 1.43 | 12.9 | 61.4 | 25.5 | 0.2 | −26.45 |
| Example 4 | n/a | 4.0 | 5.2 | 1.35 | 20.1 | 57.8 | 22.1 | 0.1 | −30.71 |

Examples 5-8: Characterization and Carbon Black Filled Compounding Evaluation of SBR-Grafted Cl-Waxes as an Oil Replacement In Examples 6-8, the wax-polymer additive of Examples 1-3 was mixed with a styrene-butadiene rubber, carbon black, oil, and other rubber composition additives and vulcanized with sulfur as shown in Table 2. Example 5 is a control that has a full loading of oil but no wax-polymer additive. Examples 5-9 replace 18 parts of the oil with an equal part of the wax-polymer additive.

TABLE 2

| | Example | | | |
|---|---|---|---|---|
| | 5 | 6 | 7 | 8 |
| SBR (Mn 108 kg/mol, Mw 323 kg/mol, styrene 20%, vinyl 55%) | 100 | 100 | 100 | 100 |
| Oil (hydrotreated, heavy-naphthenic, low-PCA oil) | 37.5 | 19.5 | 19.5 | 19.5 |
| Carbon black | 75 | 75 | 75 | 75 |
| Stearic acid | 2 | 2 | 2 | 2 |
| Antioxidant | 1 | 1 | 1 | 1 |
| Example 1 | | 18 | | |
| Example 2 | | | 18 | |
| Example 3 | | | | 18 |
| Zinc oxide | 3 | 3 | 3 | 3 |
| MBTS | 1 | 1 | 1 | 1 |
| DPG | 0.5 | 0.5 | 0.5 | 0.5 |
| Sulfur | 1.5 | 1.5 | 1.5 | 1.5 |

Table 3 shows the compound properties of Examples 5-8 showing the effect of the partial oil replacement. The SBR-grafted Cl-wax as an oil replacement increased bound rubber without trade-off of compound Mooney. In fact, the Mooney viscosity was reduced in all examples 6-8. The modified Cl-wax enhanced compound modulus with higher tan δ @ 0° C. and lower tan δ @ 50° C.

TABLE 3

| | Composition Example No. | | | |
|---|---|---|---|---|
| | 5 | 6 | 7 | 8 |
| Wax-polymer Example No. | none | 1 | 2 | 3 |
| Bound rubber (%) | 30.8 | 34.5 | 35.3 | 36.0 |
| T5 | 3.33 | 2.87 | 2.86 | 3.19 |
| T90 | 10.88 | 11.18 | 11.46 | 12.22 |
| ML1 + 4 (130° C., RPA) (pre-vulcanization) | 40 | 38 | 39 | 37 |
| Shore A   23° C. | 57.3 | 60.5 | 61.5 | 61.6 |
|           100° C. | 50.8 | 55.0 | 55.5 | 55.5 |
| STRAIN SWEEP (0° C.) | | | | |
| G' (MPa) @ 5%, 10 Hz: | 5.848 | 7.635 | 7.471 | 7.316 |
| G" (MPa) @ 5%, 10 Hz: | 3.757 | 5.656 | 5.569 | 5.373 |
| tanδ @ 5%, 10 Hz: | 0.642 | 0.741 | 0.745 | 0.734 |
| STRAIN SWEEP (50° C.) | | | | |
| G' (MPa) @ 5%, 15 Hz: | 2.430 | 2.686 | 2.595 | 2.524 |
| G" (MPa) @ 5%, 15 Hz: | 0.675 | 0.701 | 0.699 | 0.669 |
| tanδ @ 5%, 15 Hz: | 0.278 | 0.261 | 0.269 | 0.265 |
| ΔG' (MPa) [0.25-14%], 15 Hz: | 3.341 | 3.039 | 3.015 | 2.781 |

TABLE 3-continued

| | Composition Example No. | | | |
|---|---|---|---|---|
| | 5 | 6 | 7 | 8 |
| Tensile (Dumbell 23° C. unaged) | | | | |
| 50% Modulus (MPa) | 1.420 | 1.696 | 1.673 | 1.759 |
| 300% Modulus (MPa) | 10.719 | 12.300 | 12.885 | 12.861 |
| TB (MPa) | 13.5 | 13.4 | 13.0 | 12.8 |
| EB (%) | 371 | 325 | 308 | 301 |

Examples 9-14 Evaluation of SBR-Grafted Halogenated Wax as a Wax Replacement in Carbon Black Filled Composition Table 4 shows carbon black-filled rubber formulation for evaluating three different waxes: tire wax, the halogenated wax described above, and the wax-polymer additive of Example 4.

TABLE 4

| Example | 9 | 10 | 11 | 12 | 13 | 14 |
|---|---|---|---|---|---|---|
| SBR1 (Mn 108 kg/mol, Mw 323 kg/mol, styrene 25%, vinyl 13%, Tg = −64° C.) | 100 | 100 | 100 | | | |
| SBR2 (Mn 258 kg/mol, Mw 424 kg/mol, styrene 21%, vinyl 60%, $T_g$ = −28.9° C.) | | | | 100 | 100 | 100 |
| Oil | 10 | 10 | 10 | 10 | 10 | 10 |
| Carbon black | 50 | 50 | 50 | 50 | 50 | 50 |
| Stearic acid | 2 | 2 | 2 | 2 | 2 | 2 |
| Antioxidant | 1 | 1 | 1 | 1 | 1 | 1 |
| Microcrystalline tire wax* | 2 | | | 2 | | |
| Example 4 wax-polymer additive | | 3.5 | | | 3.5 | |
| Halogenated wax | | | 3.5 | | | 3.5 |
| Zinc oxide | 2.5 | 2.5 | 2.5 | 2.5 | 2.5 | 2.5 |
| DPG | 0.3 | 0.3 | 0.3 | 0.3 | 0.3 | 0.3 |
| MBTS | 0.5 | 0.5 | 0.5 | 0.5 | 0.5 | 0.5 |
| TBBS | 0.5 | 0.5 | 0.5 | 0.5 | 0.5 | 0.5 |
| Sulfur | 1.5 | 1.5 | 1.5 | 1.5 | 1.5 | 1.5 |

*Only 2 phr of microcrystalline wax was used to try and approximate the same number of carbon atoms in the chlorinated wax. The polymer-modified Cl-wax had a much lower molar ratio due to its higher molecular weight imparted by the Chlorine atoms.

Table 5 shows the compound properties of the Example 9-14 rubber compounds. Replacing tire wax and chlorinated wax, the wax-polymer additive enhanced wet traction and improved wear resistance upon humidity aging. It also provided reduced compound Mooney viscosity.

Example 15 Synthesis of Chlorinated Wax Grafted with SBR 13.3 g of styrene (34 wt % in hexane), 85.6 g of butadiene (22.6 wt % in hexane), and 210 g hexane were charged to a 0.8 Liter bottle sealed and purged with nitrogen. To the bottle was charged 7 ml of butyl lithium (1.60 M in hexane) and 3 ml of 2,2'-di(tetrahydrofuryl)propane (1.6 M in hexane). After stirring approximately 80 minutes at room temperature, 1 ml of 2,2'-di(tetrahydrofuryl)propane and 30 ml of halogenated wax (8.3% in THF) were added to the bottle. The bottle contents were then terminated with 9 ml of BHT in isopropanol, coagulated with ethanol and dried under vacuum. The isolated polymer had the following properties: Mn=4.0 kg/mol, Mw=5.4 kg/mol, MWD=1.33, T=−−26.88° C., Styrene 19.5%, Vinyl=58.2%, Cl=0.11%.

Examples 16-21 Evaluation of SBR-Grafted Cl-Waxes as a Wax Replacement in Silica-Filled Compositions Table 6 shows silica-filled rubber formulations for evaluating tire wax, the halogenated wax described above, and SBR-grafted Cl-wax of Example 15 (which was derived from the halogenated wax).

TABLE 6

| Silica-filled compounding formulation | | | | | | |
|---|---|---|---|---|---|---|
| Example | 16 | 17 | 18 | 19 | 20 | 21 |
| SBR1 (Mn 108 kg/mol, Mw 323 kg/mol, styrene 25%, vinyl 13%, Tg = −64° C.) | 100 | 100 | 100 | | | |
| SBR2 (Mn 258 kg/mol, Mw 424 kg/mol, styrene 21%, vinyl 60%, $T_g$ = −28.9° C.) | | | | 100 | 100 | 100 |
| Oil | 10 | 10 | 10 | 10 | 10 | 10 |
| Silica | 52.5 | 52.5 | 52.5 | 52.5 | 52.5 | 52.5 |
| Stearic acid | 2 | 2 | 2 | 2 | 2 | 2 |
| Antioxidant | 1 | 1 | 1 | 1 | 1 | 1 |
| Tire wax | 2 | | | 2 | | |
| Halogenated wax | | 3.5 | | | 3.5 | |
| Example 15 wax-polymer additive | | | 3.5 | | | 3.5 |
| Silica | 2.5 | 2.5 | 2.5 | 2.5 | 2.5 | 2.5 |
| Silane | 5 | 5 | 5 | 5 | 5 | 5 |
| Zinc oxide | 2.5 | 2.5 | 2.5 | 2.5 | 2.5 | 2.5 |
| TBBS | 0.7 | 0.7 | 0.7 | 0.7 | 0.7 | 0.7 |
| MBTS | 2 | 2 | 2 | 2 | 2 | 2 |

TABLE 5

| Example | 9 | 10 | 11 | 12 | 13 | 14 |
|---|---|---|---|---|---|---|
| Wax | Micro-crystalline | Ex. 4 | Halogenated wax | Micro-crystalline | Ex. 4 | Halogenated wax |
| ML1 + 4 (130° C.) (pre-vulcanization) | 43.5 | 43.1 | 43.8 | 43.7 | 43 | 46.6 |
| 0° C. | | | | | | |
| K' (lbf/in): | 297.248 | 256.817 | 290.112 | 333.027 | 250.607 | 275.704 |
| K" (lbf/in): | 71.466 | 62.017 | 65.391 | 174.731 | 110.099 | 113.264 |
| tanδ: | 0.240 | 0.241 | 0.225 | 0.521 | 0.437 | 0.411 |
| Rebound | 50.0 | 50.4 | 51.0 | 52.8 | 52.4 | 51.6 |
| Wet Stanley Unaged | 39 | 39 | 39 | 46 | 46 | 45.8 |
| Wet Stanley aged, 4 days @50° C., 95% humidity | 39 | 39 | 39 | 46 | 46 | 45.8 |
| Lambourn (25% slip) aged, 4 days @50° C., 95% humidity | 100 | 92 | 61 | 100 | 103 | 70 |

TABLE 6-continued

Silica-filled compounding formulation

| Example | 16 | 17 | 18 | 19 | 20 | 21 |
|---|---|---|---|---|---|---|
| DPG | 1.4 | 1.4 | 1.4 | 1.4 | 1.4 | 1.4 |
| Sulfur | 1.5 | 1.5 | 1.5 | 1.5 | 1.5 | 1.5 |

Table 7 shows compound properties of the rubber compounds in the absence and presence of the waxes.

TABLE 7

| Example | | 16 | 17 | 18 | 19 | 20 | 21 |
|---|---|---|---|---|---|---|---|
| Bound rubber % | | 23.9 | 25.6 | 25.7 | 28.9 | 29.1 | 29.3 |
| ML1 + 4 (130° C.) | | 47.5 | 48.9 | 46.6 | 47.4 | 49.1 | 46.8 |
| 0° C. | | | | | | | |
| K' (lbf/in): | | 514.921 | 486.100 | 431.475 | 642.384 | 683.998 | 624.356 |
| K" (lbf/in): | | 92.151 | 84.032 | 79.422 | 234.346 | 263.764 | 299.893 |
| Tanδ: | | 0.179 | 0.173 | 0.184 | 0.364 | 0.385 | 0.478 |
| 60° C. | | | | | | | |
| K' (lbf/in): | | 274.431 | 309.177 | 265.230 | 273.819 | 283.926 | 259.188 |
| K" (lbf/in): | | 34.488 | 39.893 | 33.612 | 21.135 | 24.850 | 21.103 |
| Tanδ: | | 0.126 | 0.129 | 0.127 | 0.077 | 0.088 | 0.081 |
| Rebound | | 54.8 | 51.6 | 53.6 | 52.2 | 50.4 | 51.0 |
| Lambourn (25% slip) | Aged, 4 days @50° C., 95% humidity | 102 | 77 | 108 | 172 | 64 | 189 |
| Wet Stanley | Unaged | 36.3 | 40.8 | 44.8 | 39 | 41 | 42 |
| | Aged, 4 days @50° C., 95% humidity | 41 | 44 | 44 | 48.5 | 51.5 | 51.2 |

Comparing the controls with and without tire wax or chlorinated wax, the wax-polymer additive reduced compound Mooney and increased tan δ at 0° C. with comparable or lower tan δ at 60° C. The results of Wet Stanley also indicated enhancement of wet traction in Examples 18 and 21, which contained the wax-polymer additive in comparison to those that contained tire wax or Cl-wax. Examples 18 and 21 also showed significantly better wear resistance upon humidity aging than the unmodified Cl-wax.

To the extent that the term "includes" or "including" is used in the specification or the claims, it is intended to mean "comprising." Furthermore, to the extent that the term "or" is employed, unless the context clearly indicates to the contrary, it is intended to be a non-exclusive "or", i.e., "A or B or both." As used in the description and the claims, the terms "a," "an," and "the" mean "one or more" unless the context clearly indicates otherwise.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

All references incorporated herein by reference are incorporated in their entirety unless otherwise stated.

It is claimed:

1. A tire component comprising:
   a rubber elastomer comprising a polymerized unsaturated monomer and optionally a polymerized vinyl-aromatic monomer, the rubber elastomer having a number average molecular weight of about 100,000 to about 1,000,000;
   a filler in an amount of about 5 to about 200 phr, the filler comprising carbon black, silica, or both; and
   a wax-polymer additive that includes:
   (a) a polymer component that is a polymerized unsaturated monomer, optionally copolymerized with a vinyl-aromatic monomer, and
   (b) a halogenated hydrocarbon wax component;
   the polymer component being grafted to the halogenated hydrocarbon wax component, the wax-polymer additive having a number average molecular weight of about 1,000 to about 100,000.

2. The tire component of claim 1, wherein the filler comprises silica.

3. The tire component of claim 1, wherein the tire component is a tire tread.

4. The tire component of claim 1, wherein the halogenated hydrocarbon wax component is a solid at 0° C.

5. The tire component of claim 1, wherein a number average molecular weight of the polymer component is about 500 to about 20,000.

6. The tire component of claim 1, wherein the wax component comprises a branched or unbranched $C_{20}$ to $C_{40}$ alkane wax.

7. The tire component of claim 1, wherein the polymer component is grafted to the halogenated hydrocarbon wax component at more than one graft location.

8. The tire component of claim 1, wherein the halogenated hydrocarbon wax component is halogenated along a hydrocarbon chain backbone of the wax.

9. The tire component of claim 1, wherein the rubber elastomer comprises a styrene-butadiene rubber.

10. The tire component of claim 1, wherein the polymer component is copolymerized with the vinyl-aromatic monomer.

11. The tire component of claim 1, further comprising about 5 phr or less of processing oil and the filler includes carbon black, wherein the tire component, pre-vulcanization, has a Mooney viscosity (ML1+4, 103° C., RPA) of about 20 to about 60.

12. The tire component of claim 1, wherein the filler includes carbon black, and the tire component has a bound rubber content of about 31% to about 50%.

13. A method for making a composition comprising:
mixing:
- a rubber elastomer comprising a polymerized unsaturated monomer and optionally a polymerized vinyl-aromatic monomer, the elastomer having a number average molecular weight of about 100,000 to about 1,000,000;
- a filler in an amount of about 5 to about 200 phr, the filler comprising carbon black, silica, or both;
- a wax-polymer additive that includes:
  - (a) a polymer component that is a polymerized unsaturated monomer, optionally copolymerized with a vinyl-aromatic monomer, and
  - (b) a halogenated hydrocarbon wax component,
- the polymer component grafted to the halogenated hydrocarbon wax component, the wax-polymer additive having a number average molecular weight of about 1,000 to about 100,000; and
- curing the composition.

14. The method of claim 13, wherein the halogenated hydrocarbon wax component is present in a ratio with the polymer component in a range of about 1:1 to about 1:20.

15. The method of claim 13, wherein the polymer component comprises two or more polymer chains that are bonded to a single halogenated hydrocarbon wax.

16. The method of claim 13, wherein the rubber elastomer comprises a styrene-butadiene rubber.

17. The method of claim 13, wherein the curing step comprises vulcanizing.

18. The method of claim 13, wherein the filler comprises silica.

19. The method of claim 13, wherein the polymer component is polymerized in the same container as the mixing of the wax-polymer compound.

20. A coated silica compound comprising:
- silica coated with a wax-polymer compound, the wax-polymer compound comprising:
  - (a) a polymer component that is a polymerized unsaturated monomer, optionally copolymerized with a vinyl-aromatic monomer, and
  - (b) a halogenated hydrocarbon wax component;
- the polymer component grafted to the halogenated hydrocarbon wax component, the wax-polymer compound having a number average molecular weight of about 1,000 to about 100,000.

* * * * *